June 6, 1972   M. G. HOOD   3,667,735
CENTRIFUGAL CEMENT SLURRY MIXER
Filed June 3, 1970   3 Sheets-Sheet 1

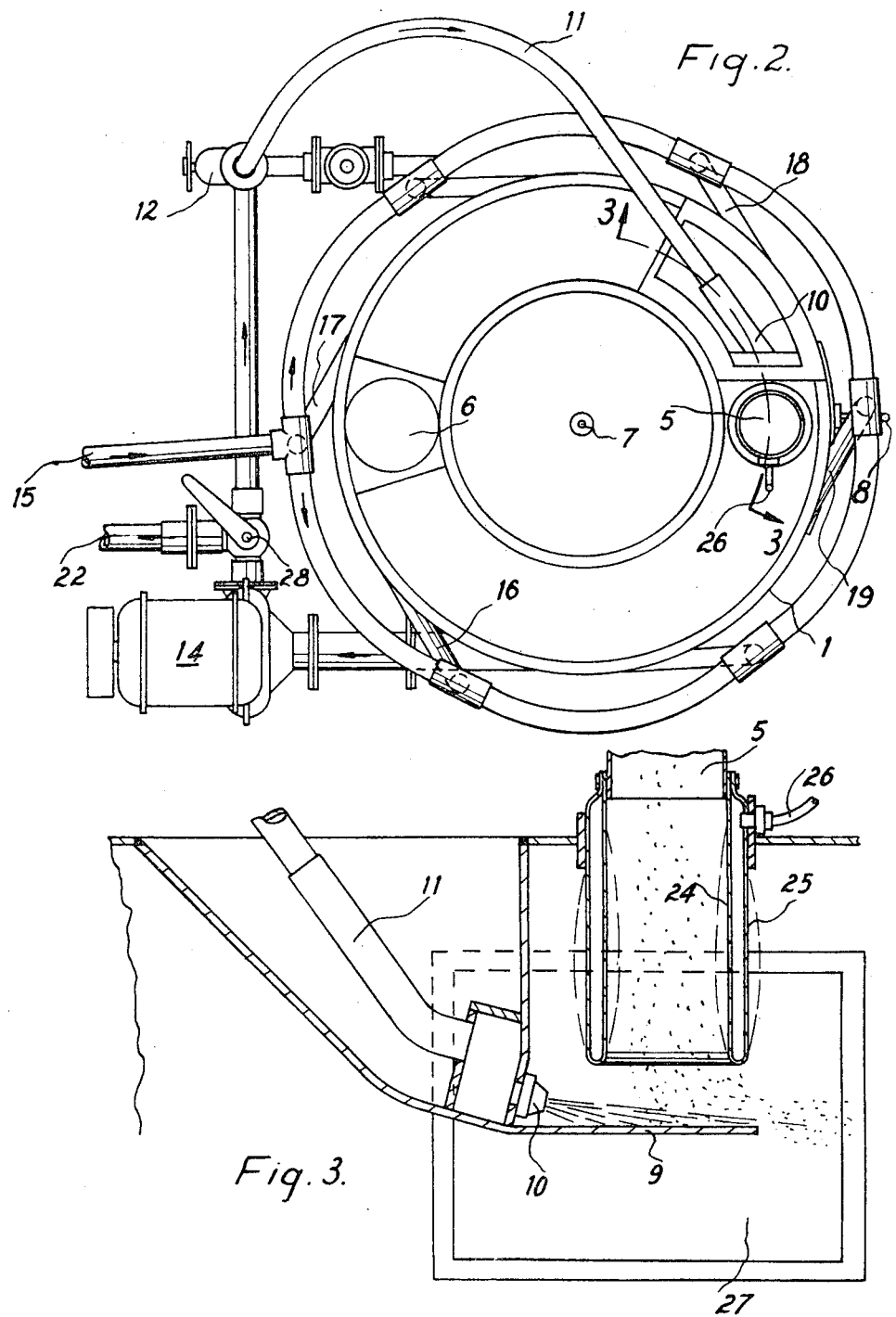

June 6, 1972   M. G. HOOD   3,667,735

CENTRIFUGAL CEMENT SLURRY MIXER

Filed June 3, 1970   3 Sheets-Sheet 3

Patent 3,667,735

3,667,735
CENTRIFUGAL CEMENT SLURRY MIXER
Maxwell G. Hood, St. Ives, New South Wales, Australia, assignor to Fowler Rex Pty. Limited, Brookvale, New South Wales, Australia
Filed June 3, 1970, Ser. No. 43,002
Int. Cl. B28c 5/06
U.S. Cl. 259—151         5 Claims

ABSTRACT OF THE DISCLOSURE

An apparatus for mixing cement-water slurry in which a tank having an annular mixing chamber is disposed about a core and a flexible hollow cylinder mounted above the core has flexible walls for the introduction of pulsating air into it. Tangentially located nozzles admit water to the upper part of the chamber. Cement is also introduced into the upper region of the chamber near the flexible pulsating wall. The slurry mixed in the chamber is recirculated from a suction outlet near the bottom of the chamber to an intermediate level via a valve which can deliver water alone or slurry from within the chamber or slurry from the suction outlet.

---

This invention relates to a method and apparatus for mixing, and will be described more particularly herein with reference to a centrifugal type mixer for substances such as cement slurry.

It is an object of the invention to provide a mixer of the above kind, adapted to mix portland or other cement with water to form a slurry as an aid towards the more efficient and economical mixing of concrete. The invention is, however, applicable to the mixing of other powdered materials with water or other liquids to a consistency capable of being transmitted by a centrifugal pump.

It is a problem when introducing cement into mixers such as the mobile mixers habitually mounted on trucks or other vehicles, to simultaneously introduce said cement together with fine and coarse aggregate and with water. This is due to a tendency for the agglomeration of cement particles, and even after prolonged mixing a significant percentage of these particles remain stuck together so that the inner ones are kept out of contact with the water, and hence not hydrated. This lowers the strength of the resulting concrete below the level which it would possess if all such particles were hydrated.

Furthermore, the feeding of large volumes of dry cement and aggregate into truck mixers through a comparatively small charging opening results in a rush of air out of the drum opening as it is displaced from the mixer drum by the incoming ingredients. The velocity and amount of escaping air is sufficient to carry out significant quantities of cement resulting in a dust problem and significant cement loss.

In an effort to keep the dust problem and cement losses to a minimum, it is often necessary to reduce the rate of charging of truck mixers, thus increasing the duration of the charging times.

It is an object of the present invention to provide a system wherein the production of portland cement concrete is improved by proportioning the ingredients in weight-batching equipment, and then feeding them into truck-mounted mixers for mixing during transport to a point of use of the concrete. It is a further object of the invention to provide a method whereby cement and water are thoroughly mixed in predetermined quantities before being fed into the truck mixer simultaneously with fine and coarse aggregate which has been proportioned in a separate weight-batching system.

One embodiment of the invention will now be described with reference to the accompanying drawings in which similar references indicate corresponding parts, and in which:

FIG. 2 shows, in plan view, the apparatus of FIG. 1,

Figure 1:
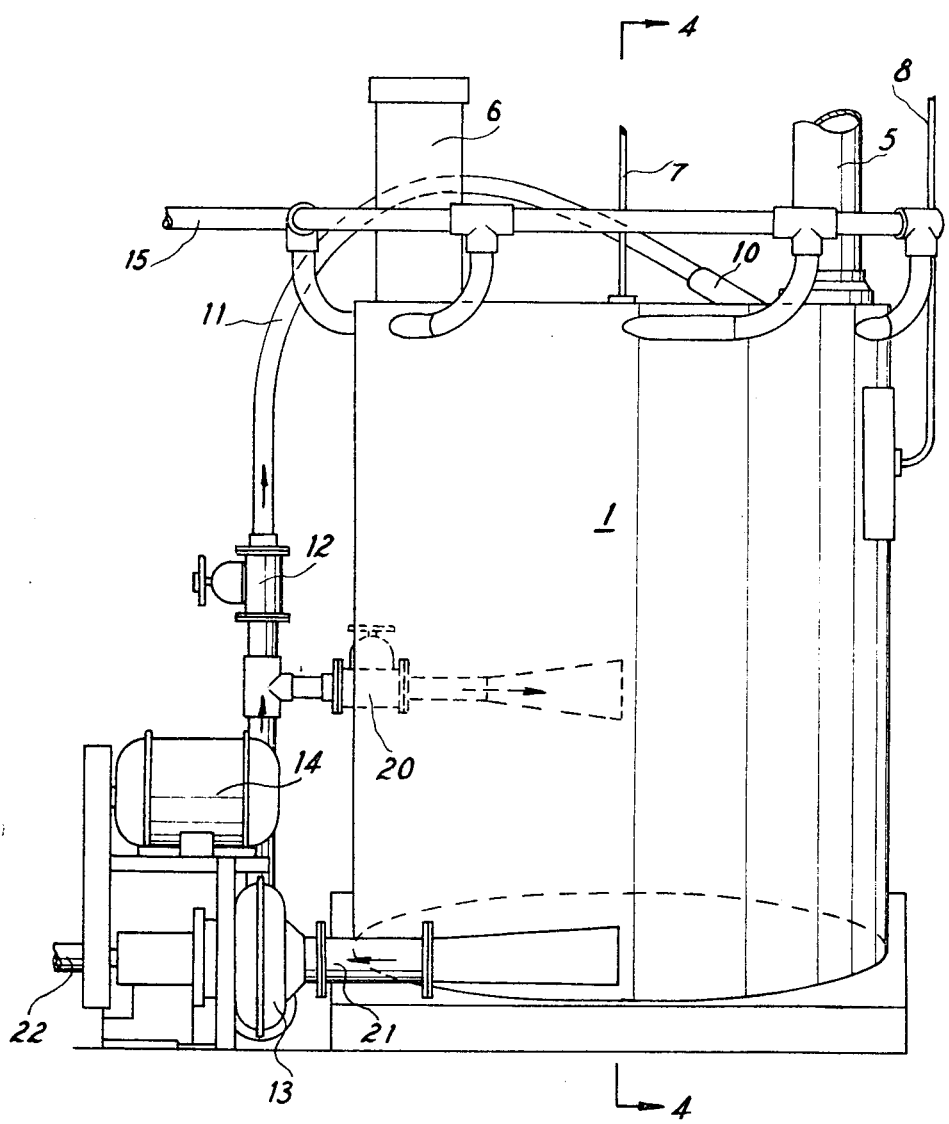
FIG. 1 shows a slurry mixer in front elevation.
Figure 4:
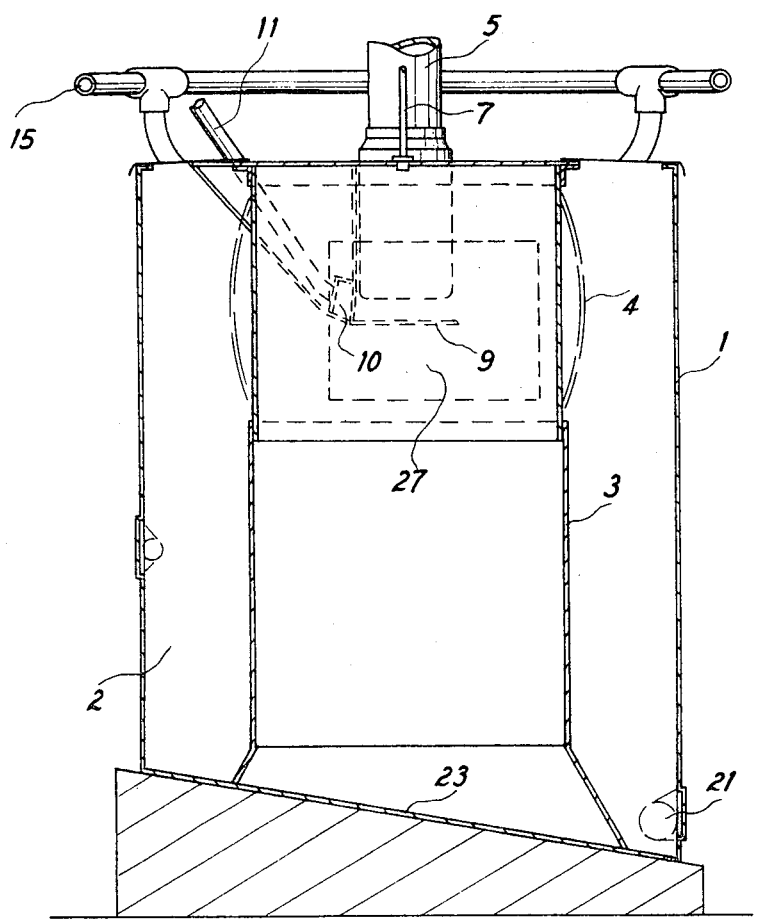

FIG. 3 shows, in elevation and partly in section, a view along the line 3—3 of FIG. 2, and FIG. 4 shows, in side elevation and partly in section, a view along the line 4—4 of FIG. 1, Upon referring to the drawings it will be seen that a tank 1 is provided with an annular mixing chamber 2 disposed around an inner core 3 above which is mounted a hollow upper cylinder 4 having flexible walls. Dry cement is admitted via supply tube 5 on to plate 9 which is simultaneously swept by water initially and later by liquid cement slurry from nozzle 10 from the pipe 11 via a 3-way valve 28 and the pump 13 which is in turn operated by a suitable motor such as 14.

The flexible walls of the upper cylinder 4 are expanded and contracted by regulated compressed air supplied by a suitable pulsating device via tube 7. The flexible walls are pulsated for the purpose of preventing cement build up due to splash of cement which occurs as cement is swept off plate 9.

Breather tube 6 is required to allow displacement of air as water and cement enter the mixing chamber. The breather contains a suitable porous membrane to restrict the egress of cement dust thus allowing reasonably clean air to escape to atmosphere during the charging cycle. The breather also allows air to enter the mixing chamber during the discharge cycle or as the slurry is pumped out of the mixing chamber.

The supply tube 5 is also provided with a terminal sock having double walls 24 and 25 to the space within which pulsating air is admitted via the pipe 26. In addition, a panel 27 in the outer wall of the tank 1 is also provided with flexible double walls to the space between which pulsating air is admitted in a similar manner via the pipe 8. All said pulsating arrangements are designed to prevent build-up of the dry cement during its input, even when delivered in large quantities. All said flexible walls may be constructed from rubber or other similar material.

Any previous charge of cement and water may be cleaned initially from the interior of the chamber 2 by fresh water admitted through the pipe 15 and delivered through the branch pipes 16, 17, 18 and 19. These pipes may continue to deliver high-speed jets of water to assist the break-up of incoming cement.

After all the required water and cement has been introduced as above described, rapid and efficient mixing is achieved by the initial contact of the incoming cement with a high pressure jet from nozzle 10 and plate 9 after which the partially mixed material enters the annular chamber 2.

Due to the rapidly swirling water or slurry further mixing is achieved by the turbulence created or induced by the slurry entering the pump 13 from tangented pipe 21 and thence through valve 28 to tangented valve and pipe 20 and also from valve 12 to pipe 11 and nozzle 10. The volume and pressure of the water or slurry may be regulated by presetting valve 20 and valve 12, thus allowing suitable pressure to be available at nozzle 10.

Valves 12 and 20 remain open or as preset at all times but once the cement is completely mixed with the water (a process which takes place just as quickly as the cement is fed into the machine) valve 28 is moved from a first position to a second position, thus diverting all the slurry through pipe 22. Pipe 22 extends to the truck mixer charging point or any concrete mixer used. The pipe is fitted with a flow control valve to enable the discharge time of all the slurry in the mixer to coincide with discharge of sand and aggregates from other sources into a final concrete mixer or truck mixer. The discharge of the machine is facilitated by the slope of the floor 23 of tank 1 and chamber 2 ensuring that said chamber is substantially emptied.

The pump 13 may be a centrifugal pump having a capacity of the order of 600 to 800 gallons per minute. The motor 14 may be a suitable electric motor.

Preferably the water is delivered at high velocity from the pipes 16, 17, 18 and 19 to break up the bulk of said cement to facilitate mixing. The use of a centrifugal pump to provide the high velocity of initial water flow and the recirculation of the cement-water slurry improves the quality of mixing and prevents settlement of cement. The recirculation process allows all the cement and water to come into intimate contact with the pump impeller, and it is in this way that the very fine particles are broken up and thoroughly mixed with the water, thus eliminating the cement agglomerates associated with conventional transit-mixed concrete.

Also, the use of a series of water jets for initial contact with incoming cement firstly achieves early dispersion of cement prior to cement reaching the rapidly rotating water in the annular chamber, and secondly prevents build-up of cement in the entry area.

The entire machine may be mounted on a mechanical scale or electrical load cells to sufficient capacity, thus allowing the water and cement to be cumulatively weight-batched whilst mixing is in process. The pump 13 and the tank 1 are designed as a self-contained unit and may be supported on such weighing devices. Flexible rubber connections, which may be used for incoming and outgoing materials, allow the mixed to be used as a weight-batcher and thus eliminate the use of separate weight-batches as commonly used on the majority of dry batch concrete plants. The utilisation of the mixer as a weight-batcher further increases the output capacity and as concrete design is largely influenced by the water-cement ratio, combining the weight-batching of water and cement facilitates quality control of the end product, and simplifies the addition of concrete additives which could be dispensed in a normal manner, but when fed into the slurry mixer, ensure thorough dispersion of such chemical ingredients throughout the cement slurry.

The mixed slurry may be directed into a truck-mounted or transit mixer by use of said 3-way valve 28, thus enabling a batch to be discharged at the required flow rate.

An advantage of the slurry mixer is its ability to pump the slurry to levels above the base of the mixer, and this feature makes it possible to fit the machine into any existing batching plant where original design layouts do not provide elevation or space into which gravity discharging mechanically operated slurry or central mixers may be fitted. Such mechanical slurry mixers must discharge by gravity through a bottom door and this usually requires drastic alterations to existing or proposed batching plant design.

It will be seen therefore that apparatus constructed in accordance with the invention possesses the following advantages:

Improvement of the efficiency of the overall mixing function through the better dispersion of cement and the greater exposure of individual cement particles to hydration.

Reduction in the time required to batch the ingredients and feed them into a truck-mounted mixer.

Elimination of dust nuisance—a major problem in all dry batch concrete plants.

Reduction in cement losses.

(1) The use of a sand or slurry pump for mixing and recirculating cement and water, and resultant slurry.

(2) The use of the annular mixing chamber which ensures that all the ingredients within the mixing chamber are subjected to violent mixing action, thus eliminating any static or dead areas which otherwise might reduce the mixing efficiency.

(3) The recirculation process which induces turbulence and ensures recirculation of all ingredients through the pump.

(4) The cement charging point which provides initial dispersion by the jets and the inflatable rubber sock which prevents cement build-up.

(5) The upper cylinder with its inflatable rubber sock which prevents build-up of cement which would otherwise occur on a fixed face.

(6) The use of the complete tank as a cumulative weight-batcher to enable the water and then cement to be weight-batched cumulatively during the mixing cycle, thus increasing the production output by comparison with convention dry batching plants, and batching plants fitted with central stationary mixers.

(7) The ability of the mixer to mix large volumes of cement and water faster and more efficiently than other types of mixers.

(8) The ability of the machine to convey the mixed ingredients in slurry form either upwards or downwards to a truck-mounted mixer by means of the pump and three-way valve, thus allowing the machine to be installed in any batching plant not designed to allow for gravity discharge of mixed ingredients.

I claim:

1. Apparatus for mixing cement and water to form a slurry, comprising a tank having an annular mixing chamber disposed about a core, a flexible hollow cylinder mounted on and above said core and adapted to have pulsating air introduced therein, a plurality of tangentially disposed nozzles adapted to admit said water to an upper region of said chamber, a cement supply inlet communicating with an upper region of said chamber and having the mouth thereof provided with flexible double walls within which pulsating air may be admitted, a platform disposed beneath said mouth and having a further water admitting nozzle disposed so as to wash from said platform cement dropped thereon from said mouth, a tangential suction outlet disposed near the bottom of said chamber and communicating with a pump adapted to re-admit said slurry formed in said chamber to said chamber at an intermediate level thereof via a three position valve, whereby upon locating said valve in a first position said pump delivers said water from said nozzles, and in the second position of said valve said slurry is circulated within said chamber and in the third position of said valve said slurry is via said suction outlet and discharged from said chamber.

2. Apparatus for producing slurry as claimed in claim 1, wherein a panel in the outer wall of said tank near said cement inlet is also double walled and between the walls of which pulsating air is admitted.

3. Apparatus for mixing slurry as claimed in claim 1, wherein said pump is a centrifugal pump operated by a motor.

4. Apparatus for mixing slurry as claimed in claim 1, wherein the floor of said mixing chamber is sloped towards said suction outlet to facilitate emptying of said chamber.

5. Apparatus for mixing slurry as claimed in claim 1, wherein said cement and said water admitted to said chamber is weighed or otherwise measured in batches to ensure a desired consistency of the slurry.

References Cited

UNITED STATES PATENTS

| | | | |
|---|---|---|---|
| 3,212,759 | 10/1965 | Brown | 259—151 |
| 3,236,504 | 2/1966 | Galer | 259—147 |
| 3,248,093 | 4/1966 | DeMaison | 259—151 |
| 3,251,583 | 5/1966 | Mason | 259—151 |
| 3,463,460 | 8/1969 | Taylor | 259—147 |

ROBERT W. JENKINS, Primary Examiner

U.S. Cl. X.R.

259—95